(12) United States Patent  
Kruger et al.

(10) Patent No.: US 9,665,701 B2  
(45) Date of Patent: May 30, 2017

(54) MASK BASED CHALLENGE RESPONSE TEST

(75) Inventors: Stephen P. Kruger, Mulhuddart (IE); Olgierd S. Pieczul, Mulhuddart (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 602 days.

(21) Appl. No.: 13/806,276

(22) PCT Filed: Jun. 24, 2011

(86) PCT No.: PCT/EP2011/060600  
§ 371 (c)(1),  
(2), (4) Date: Dec. 21, 2012

(87) PCT Pub. No.: WO2012/000897  
PCT Pub. Date: Jan. 5, 2012

(65) Prior Publication Data  
US 2013/0104217 A1    Apr. 25, 2013

(30) Foreign Application Priority Data

Jun. 28, 2010 (EP) ..................................... 10167535  
Jun. 28, 2010 (EP) ..................................... 10167536

(51) Int. Cl.  
*G06F 21/31* (2013.01)  
*H04L 9/32* (2006.01)  
*G06F 21/36* (2013.01)

(52) U.S. Cl.  
CPC .............. *G06F 21/31* (2013.01); *G06F 21/36* (2013.01); *H04L 9/3271* (2013.01); *G06F 2221/2133* (2013.01)

(58) Field of Classification Search  
CPC .. G06F 21/31; G06F 21/36; G06F 2221/2133; G06F 2221/2103; H04L 9/3271  
See application file for complete search history.

(56) References Cited

U.S. PATENT DOCUMENTS 6,081,828 A * 6/2000 Yonemochi et al. ......... 709/200  
7,891,005 B1 * 2/2011 Baluja et al. .................. 726/26  
(Continued)

FOREIGN PATENT DOCUMENTS

CA          2785789 A1      1/2012  
CN        101615250 A     12/2009  
(Continued)

OTHER PUBLICATIONS

Computer desk encyclopedia., "processor", http://lookup.computerlanguage.com/host_app/search?cid=C999999&term=processor&lookup.x=0&lookup.y=0.*  
(Continued)

*Primary Examiner* — Jung Kim  
*Assistant Examiner* — Carlos M De Jesus Lassala  
(74) *Attorney, Agent, or Firm* — Cuenot, Forysthe & Kim, LLC

(57) ABSTRACT

Providing a challenge response test associated with a computer resource includes generating a challenge response test image including providing a first substantially well-formed image, including a first masked image having a visible portion entirely composed of portions of a first well-formed image, and a first plurality of image elements; and providing at least one ill-formed image, each at least one ill-formed image including a second masked image having at least one first ill-formed portion.

18 Claims, 8 Drawing Sheets

(56) References Cited

U.S. PATENT DOCUMENTS

| | | | |
|---|---|---|---|
| 8,209,743 | B1 | 6/2012 | Frank |
| 8,307,407 | B2 * | 11/2012 | Jakobsson et al. ............... 726/2 |
| 8,869,246 | B2 | 10/2014 | Kruger et al. |
| 8,898,740 | B2 | 11/2014 | Kruger et al. |
| 2008/0127302 | A1 | 5/2008 | Qvarfordt et al. |
| 2008/0216163 | A1* | 9/2008 | Pratte et al. ...................... 726/7 |
| 2009/0094687 | A1* | 4/2009 | Jastrebski et al. ............... 726/6 |
| 2009/0113294 | A1 | 4/2009 | Sanghavi et al. |
| 2009/0138723 | A1 | 5/2009 | Nyang et al. |
| 2009/0232351 | A1 | 9/2009 | Kagitani et al. |
| 2009/0235327 | A1 | 9/2009 | Jakobsson et al. |
| 2009/0313694 | A1 | 12/2009 | Mates |
| 2010/0077210 | A1* | 3/2010 | Broder et al. ................ 713/168 |
| 2011/0081640 | A1 | 4/2011 | Tseng et al. |
| 2011/0208716 | A1 | 8/2011 | Liu et al. |
| 2011/0321138 | A1 | 12/2011 | Kruger et al. |
| 2012/0192266 | A1 | 7/2012 | Kruger et al. |

FOREIGN PATENT DOCUMENTS

| | | |
|---|---|---|
| CN | 102893287 A | 1/2013 |
| EP | 2585969 A1 | 5/2013 |
| JP | 2007300207 A | 11/2007 |
| JP | 2008052727 A | 3/2008 |
| JP | 2009175988 A | 8/2009 |
| JP | 2009301554 A | 12/2009 |
| JP | 2010067096 A | 3/2010 |
| JP | 2013532342 A | 8/2013 |
| KR | 20130010472 A | 1/2013 |
| MX | 2012014531 A | 1/2013 |
| WO | 2012000897 A1 | 1/2012 |

OTHER PUBLICATIONS

Computer desk encyclopedia., "processor", http://lookup.computerlanguage.com/host_app/search?cid=C999999&term=processor&lookup.x=O&lookup.y=O.*

Misra et al., "Face Recognition CAPTCHAs" Feb. 2006, pp. 1-6 http://ieeexplore.ieee.org/stamp/stamp.jsp?tp=&arnumber=1602255.*

Chew et al., "Baffletext: a human interactive Proof", 2003, pp. 305-316 http://proceedings.spiedigitallibrary.org/proceeding.aspx?articleid=755982.*

Dictionary.com, "processor", http://dictionary.reference.com/browse/processor.*

WIPO Int'l Appln. No. PCT/EP2011/060600, Examination Report, Oct. 8, 2013, 7 pg.

Misra, D. et al., "Face Recognition CAPTCHAs", Advanced Int'l. Conf. on elecommunications, 2005, ICT-ICIW '06, Int'l Conf. on Internet and Web Applications and Services, Feb. 19-25, 2006, IEEE, pp. 122-122, 4 pg.

"GIMP 2.2 User Manual," GIMP.Org © 2002-2013 The GIMP Documentation Team, Chapter 12.1 Map Filters-Intro., Chapter 12.5 Map Filters—Illusion, Chapter 12.2 Map Filters—Bump Map; Chapter 12.11 Map Filters—Warp Filter, Chapter 12.12 Map Filters—Van Gogh (LIC) filter [retrieved Sep. 30, 2013] retrieved from the Internet: <http://web.archive.org/web/20071109211548/http://docs.gimp.org/2.2/en/>, 12 pg.

Matthews, P. et al., "Scene tagging: image-based CAPTCHA using image composition and object relationships," Proc. of 5th ACM Sym. on Information, Computer and Communicaitons Security, pp. 345-350, ASIACCS '10, 2010, retrieved from the Internet: <http://www.eecs.ucf.edu/~czou/research/Captcha-asiaCCS10.pdf>, 6 pgs.

PCT Application No. PCT/EP2011/060600, International Search Report, Oct. 10, 2011, 3 pgs.

Willis, J.M. "Top 10 Worst Captchas," [online] John M. Willis Blog, IT Management and Cloud Blog, Feb. 16, 2008, [retrieved Dec. 20, 2012] retrieved from the Internet: <http://www.johnmwillis.com/other/top-10-worst-captchas/>, 22 pgs.

Meyers, P.J., "Simple Optical Illusion CAPTCHA," [online] User Effect, May 13, 2010 [retrieved Dec. 20, 2012] retrieved from the Internet: <http://www.usereffect.com/topic/simple-optical-illusion-captcha>, 4 pgs.

"Maclites with Captcha Plugin for WordPress to Comment Spam on Blogs," Maclites Magazine © 2009-2012, Mar. 16, 2010, [retrieved Dec. 20, 2012] retrieved from the Internet: <http://maclites.com/blog/antispam-tipps/kommentarspam-captchas-wordpress-plugins-antispam-tipp-2>, 3 pgs.

Yamamoto, T. et al., "CAPTCHA Using Strangeness in Machine Translation," 2010 24th IEEE Int'l. Conf. on Advanced Information Networkging and Applicaitons (AINA), pp. 430-437, Apr. 20, 2010, 1 pg.

Datta, R. et al., "Exploiting the human-machine gap in image recognition for designing captchas," [online] IEEE Trans. on Information Forensics and Security, IEEE, vol. 4, No. 3, pp. 504-518, Sep. 1, 2009 [retrieved Dec. 20, 2012] retrieved from the Internet: <http://infolab.stanford.ed/~wangz/project/imsearch/IMAGINATION/IEEE09/datta.pdf>.

EP Appln. No. 110728252.5, Examination Report, Oct. 8, 2013, 7 pages.

MX Appln. No. MX/a/2012/014531, Translation of Office Action, Mar. 25, 2014, 2 pages.

Harada, A. et al., "A user authentication system using schema of visual memory," In Biologically Inspired Approaches to Advanced Information Technology, pp. 338-345. Springer Berlin Heidelberg, 2006, 8 pg.

U.S. Appl. No. 13/155,654, Non-Final Office Action, Jul. 29, 2013, 20 pg.

U.S. Appl. No. 13/155,654, Final Office Action, Jan. 22, 2014, 10 pg.

U.S. Appl. No. 13/155,654, Examiner Interview Summary, Jul. 17, 2014, 2 pg.

U.S. Appl. No. 13/155,654, Notice of Allowance, Jul. 17, 2014, 13 pg.

U.S. Appl. No. 13/426,101, Non-Final Office Action, Aug. 12, 2013, 21 pg.

U.S. Appl. No. 13/426,101, Final Office Action, Jan. 22, 2014, 21 pg.

U.S. Appl. No. 13/426,101, Examiner Interview Summary, Jun. 20, 2014, 2 pg.

U.S. Appl. No. 13/426,101, Notice of Allowance, Jun. 20, 2014, 13 pg.

* cited by examiner

MASK BASED CHALLENGE RESPONSE TEST

CROSS-REFERENCE TO RELATED APPLICATIONS

This application is the national stage of PCT/EP2011/060600 filed Jun. 24, 2011, designating, inter alia, the United States and claiming priority to European Patent Application No. 10167535.3 dated Jun. 28, 2010, and European Patent Application No. 10167536.1 dated Jun. 28, 2010, each of which is hereby incorporated by reference in its entirety.

BACKGROUND

A CAPTCHA ("Completely Automated Public Turing test to tell Computers and Humans Apart") is a challenge response test that is commonly used in computing to ensure that a responder to a test set by a server is a human, and not another computer. Typically, humans have no difficulty with passing the test, but computers do have difficulty, because the test typically requires cognitive abilities that the other computers do not have. Therefore, if the test is passed, the server presenting the test presumes that the respondent is human. The server may then allow the respondent access to a protected computer resource associated with the test.

A typical use of a CAPTCHA is when a user wishes to access an internet resource, for example a database on a server. Before the user can access the database, a test is presented. If the user passes the test, access to the database is allowed. If the user fails the test, access to the database is denied. Captchas may therefore be used to deter automated access attack requests on web services. However, if a computer can respond correctly to a CAPTCHA, the computer can access the protected computer resource. An example of a use of a CAPTCHA is for websites that provide free email address accounts. Typically, such websites are attractive to spammers, who are interested in opening multiple email address accounts from which to spam from. In this example, a registration process protected by a CAPTCHA is useful to deter automatic acquisition of email address accounts.

Existing captchas are fallible, because cracking algorithms have been developed for computer programs to solve such tests developed to date. New captchas can be cracked unless the test is so complex that the cost of cracking becomes prohibitively high.

An example of a prior art CAPTCHA requires a human user to confirm a set of symbols in a CAPTCHA image that has been presented to the user. Typically, the CAPTCHA image comprises a set of distorted symbols and backgrounds, and therefore the CAPTCHA tests whether the user can recognise the distorted symbols. Typical distortions include an angled line over the symbols, or the crowding of the symbols together, so that image segmentation analysis is difficult for a cracking algorithm. However, although such analysis is difficult, it is not impossible. It is also difficult to present a text in a way that is easily recognisable by human while being difficult to recognize by a machine. The approach is based on the human ability of recognising single characters. It is not applicable to use for users that do not use characters of an alphabet used by the system, which is often Latin script. However, graphical transformations of non-Latin characters may make them harder to interpret. Systems requiring entering the text can also cause accessibility problems for people using keyboard less devices.

Another example of a prior art CAPTCHA requires the user to select a CAPTCHA image that has a particular property, from a set of CAPTCHA images that do not possess that property. For example, the property may be that the CAPTCHA image represents a word in a particular language. A cracking algorithm could resolve this by image segmentation to identify each word represented by the CAPTCHA image, and a comparison of each word with words in a dictionary. An example of a selectable CAPTCHA is described in US Patent Publication 2009/0235327 A1 (Jakobsson, B M, et. al. "Selectable Captchas").

An alternative example of a prior art CAPTCHA requires the user to answer a question about the relative locations of a number of objects depicted in the CAPTCHA image 650. For example, a CAPTCHA image 650 may present four commonly recognisable objects. The user may be asked to name the object that is above another object. A cracking algorithm could resolve this by identifying the objects using common object recognition algorithms.

Therefore, there is a need in the art to address the aforementioned problem.

BRIEF SUMMARY

A method of providing a challenge response test associated with a computer resource includes generating, using a processor, a challenge response test image. Generating a challenge response test image includes providing a first substantially well-formed image, comprising a first masked image having a visible portion entirely composed of portions of a first well-formed image, and a first plurality of image elements, and providing at least one ill-formed image, each at least one ill-formed image comprising a second masked image comprising at least one first ill-formed portion.

A system for providing a challenge response test associated with a computer resource includes a processor programmed to initiate executable operations. The executable operations include generating a challenge response test image. Generating a challenge response test image includes providing a first substantially well-formed image, comprising a first masked image having a visible portion entirely composed of portions of a first well-formed image, and a first plurality of image elements, and providing at least one ill-formed image, each at least one ill-formed image comprising a second masked image comprising at least one first ill-formed portion.

A computer program product for providing a challenge response test associated with a computer resource includes a computer readable storage medium having program code stored thereon. The program code is executable by a processor to perform a method. The method includes generating, using the processor, a challenge response test image. Generating a challenge response test image includes providing, using the processor, a first substantially well-formed image, comprising a first masked image having a visible portion entirely composed of portions of a first well-formed image, and a first plurality of image elements and providing, using the processor, at least one ill-formed image, each at least one ill-formed image comprising a second masked image comprising at least one first ill-formed portion.

BRIEF DESCRIPTION OF THE SEVERAL VIEWS OF THE DRAWINGS

The present invention will now be described, by way of example only, with reference to preferred embodiments, as illustrated in the following figures.

DETAILED DESCRIPTION

Figure 1:
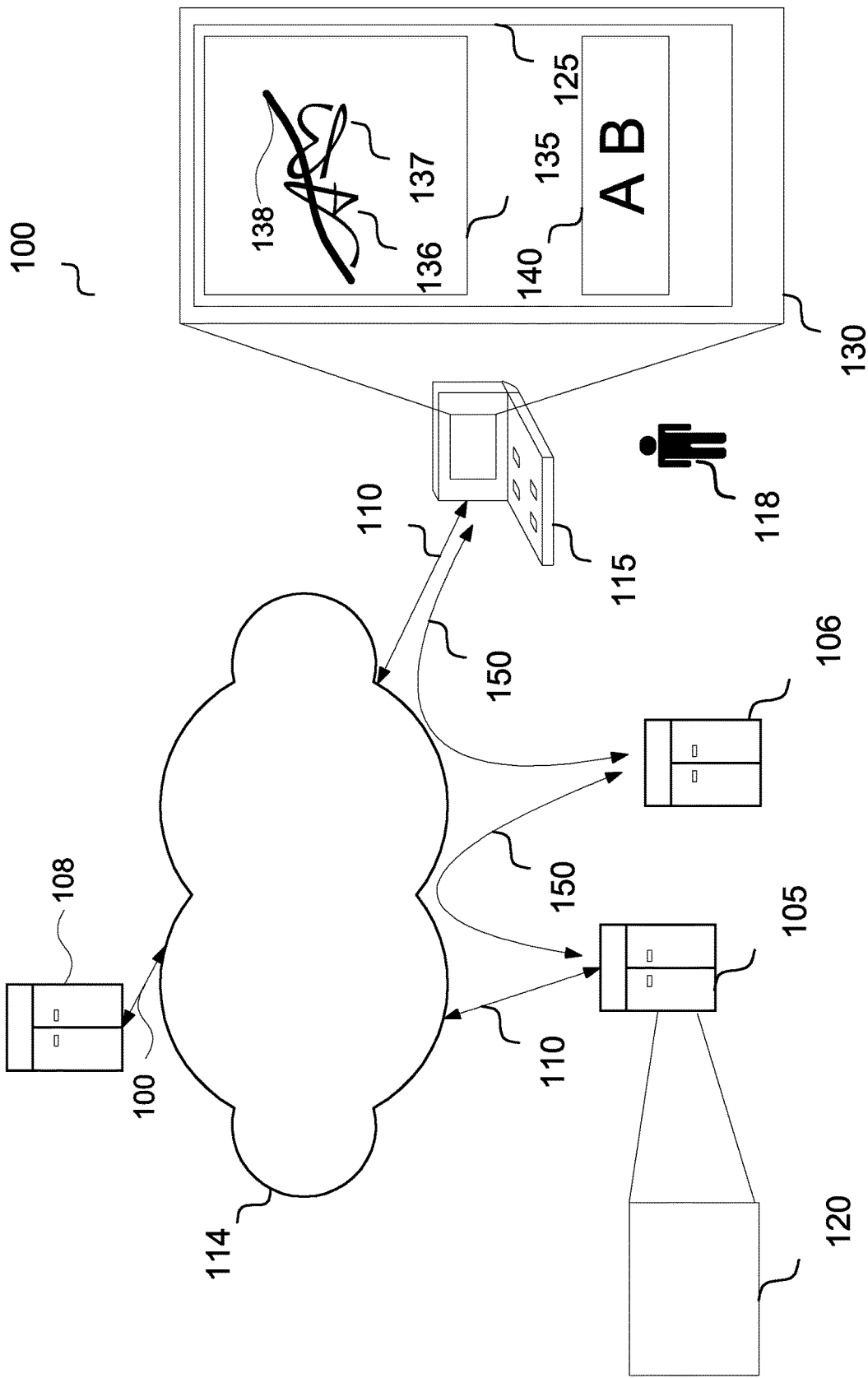
FIG. 1 is a block diagram depicting a computer system, in accordance with the prior art, and in which a preferred embodiment of the present invention may be implemented.

One or more embodiments relate to challenge response tests and, more particularly, to an apparatus and method for providing a challenge response test associated with a computer resource.

Viewed from a first aspect, the present invention provides a method for providing a challenge response test associated with a computer resource, the method comprising the step of: generating a challenge response test image comprising the steps of: providing a first substantially well-formed image, comprising a first masked image having a visible portion entirely composed of portions of a first well-formed image, and a first plurality of image elements; and providing at least one ill-formed image, each at least one ill-formed image comprising a second masked image comprising at least one first ill-formed portion.

In one aspect, the present invention provides a method, wherein: the step of providing the first substantially well-formed image, comprises the steps of: providing the first well-formed image; placing the first well-formed image in a framework to determine a second well-formed image, comprising the first plurality of image elements; and applying, in response to the step of determining the second well-formed image, a mask to the second well-formed image to generate the first masked image; and the step of providing the at least one ill-formed image, comprises the steps of: generating, in response to the step of placing the first well-formed image in the framework, an ill-formed image, composed entirely of the first plurality of image elements and comprising a second ill-formed portion; and applying, in response to the step of generating the ill-formed image, a mask to the ill-formed image to generate the second masked image.

In another aspect, the present invention provides a method, wherein the step of generating the challenge response test image further comprises the steps of: providing the first well-formed image comprising a third plurality of image elements, wherein the third plurality of image elements comprises the first plurality of image elements; providing at least one second well-formed image, comprising a fourth plurality of image elements; placing each of the third plurality of construct elements in a framework; placing each of the fourth plurality of construct elements in the framework; applying, in response to the steps of placing each of the third plurality of image elements and the fourth plurality of image elements in the framework, a first mask to the framework to generate the first masked image; and applying, in response to the steps of placing each of the third plurality of image elements and the fourth plurality of image elements in the framework, at least one second mask to the framework to generate the at least one ill-formed image.

In another aspect, the present invention provides a method, wherein the method further comprises the step of transmitting the challenge response test image to a recipient.

In another aspect, the present invention provides a method, wherein the method further comprises the step of: receiving, in response to the step of transmitting the challenge response test image to the recipient, a reply message associated with the transmitted challenge response test image.

In another aspect, the present invention provides a method, wherein the method further comprises the steps of: in response to the step of receiving the reply message, evaluating whether the reply message matches a value associated with the challenge response test image, the value indicating that the recipient has correctly identified the substantially well-formed construct; and in response to the step of evaluating that the reply message matches the value, sending an authentication message to allow the recipient access to the computer resource.

In another aspect, the present invention provides a method, wherein the step of placing each of the third set of construct elements in a framework comprises the step of placing each of the third set of construct elements in an N×M grid.

Viewed from a second aspect, the present invention provides an apparatus for providing a challenge response test associated with a computer resource, the apparatus comprising: a generate component: for generating a challenge response test image; for providing a first substantially well-formed image, comprising a first masked image having a visible portion entirely composed of portions of a first well-formed image, and a first plurality of image elements; and for providing at least one ill-formed image, each at least one ill-formed image comprising a second masked image comprising at least one first ill-formed portion.

In one aspect, the present invention provides an apparatus, wherein the apparatus further comprises: an analyze component for providing the first well-formed image; a place component for placing the first well-formed image in a framework to determine a second well-formed image, comprising the first plurality of image elements; and the generate component further operable for applying, responsive to the place component determining the second well-formed image, a mask to the second well-formed image to generate the first masked image; a manipulate component for generating, responsive to the place component placing the first well-formed image in the framework, an ill-formed image, composed entirely of the first plurality of image elements and comprising a second ill-formed portion; and the generate component further operable for applying, responsive to the manipulate component generating the ill-formed image, a mask to the ill-formed image to generate the second masked image.

In another aspect, the present invention provides an apparatus, wherein the apparatus further comprises: an analyze component for providing the first well-formed image comprising a third plurality of image elements, wherein the third plurality of image elements comprises the first plurality of image elements; the analyze component further operable for providing at least one second well-formed image, comprising a fourth plurality of image elements; a place component for placing each of the third plurality of construct elements in a framework; the place component further operable for placing each of the fourth plurality of construct elements in the framework; the generate component further operable for applying, responsive to the place component placing each of the third plurality of image elements and the fourth plurality of image elements in the framework, a first mask to the framework to generate the first masked image; and the generate component further operable for applying, responsive to the place component placing each of the third plurality of image elements and the fourth plurality of image elements in the framework, at least one second mask to the framework to generate the at least one ill-formed image.

In another aspect, the present invention provides an apparatus, wherein the apparatus further comprises a transmit component for transmitting the challenge response test image to a recipient.

In another aspect, the present invention provides an apparatus, wherein the apparatus further comprises: a receive component for receiving, responsive to the transmit component transmitting the challenge response test image to the recipient, a reply message associated with the transmitted challenge response test image.

In another aspect, the present invention provides an apparatus, wherein the apparatus further comprises: responsive to the receive component receiving the reply message, an evaluate component for evaluating whether the reply message matches a value associated with the challenge response test image, the value indicating that the recipient has correctly identified the substantially well-formed construct; and responsive to the evaluate component evaluating that the reply message matches the value, the transmit component further operable for transmitting an authentication message to allow the recipient access to the computer resource.

In another aspect, the present invention provides an apparatus, wherein the framework comprises an N×M grid.

Viewed from a third aspect, the present invention provides a computer program stored on a computer readable medium and loadable into the internal memory of a digital computer, comprising software code portions, when said program is run on a computer, for performing the steps of the invention.

One or more embodiments of the present invention provide a challenge response test (CAPTCHA) that allows use of the cognitive ability of humans to easily detect portions of a source image as being part of that source image. Despite the lack of a complete image, humans are very good at filling in the missing information, something which an automated process would not be very good at.

One or more embodiments of the present invention provide an improvement of existing systems in that it is click based, rather than forcing users to type in characters. A click based system is particularly advantageous on a handheld device, because a click response is easier than entering text.

One or more embodiments of the present invention allow for more complex elements for a challenge response test to be added, for example by including different size cell windows, different colour mask elements, and using uncommon images. These complex elements increase complexity for potential cracking algorithms, but without increasing complexity to humans responding to the challenge response test.

One or more embodiments of the present invention allow for different size and types of framework, and for the reuse of masks for providing both good and bad masks, for example by using rotation.

One or more embodiments of the present invention significantly increase the difficulty for a cracking algorithm, requiring much more processing and much complex algorithms. Further, usability is improved, because image recognition can be easier for humans than digitally transformed, often unreadable texts. It also does not limit the usage to users knowing a single set of characters/alphabet or any character system at all. Accessibility is also improved, because there is no requirement to enter any texts, but rather a response can be given by a simple click, or even a voice response.

One or more embodiments of the present invention provide features that protect against a cracking algorithm that could try to detect a colour change on edges between adjacent image parts (excluding transition between image part and mask), thereby detecting that adjacent image elements containing content from a different images. These advantageous features comprise:

Using high colour-resolution images so it would be very rare that even adjacent pixels would be of the same colour. A cracking algorithm would be forced to make decisions based on statistics.

Using smaller masks to increase amount of calculations needed, reducing amount of large edges to compare increasing number of false positives and negatives resulting in hard to compare statistic results.

Defining masks in a way that will minimize a number of adjacent blocks of an image giving a cracking algorithm less material to compare.

Using different kinds of masks that are not trivial to detect (for example, complicated shapes, and various mosaics of shapes), different every time, instead of rectangular masks as presented in the embodiments. A cracking algorithm would need to first detect which parts belong to the mask and which to the image.

FIG. 1 is a block diagram depicting a computer system 100, in accordance with the prior art, and in which a preferred embodiment of the present invention may be implemented. The computer system 100 comprises computer devices, such as a first server 105, a second server 106, a third server 108 and a workstation 115, connectable through a network 114, which may comprise a wired network 110 or a wireless network (not shown). An example of a network is the Internet 114. A user 118 uses the workstation 115 to access a server resource 120 available on the first server 105. The workstation 115 could be a handheld device 115.

When the user 118 enters a uniform resource locator (URL) address of a webpage 125, a request is sent to the first server 105, which presents a CAPTCHA image 135, which is displayed in a window 130 of the workstation 115. The webpage 125 is typically a hypertext markup text language (html) rendering of a server webpage 120 on the server 105. The CAPTCHA may also be available to the third server 108, if the third server 108 attempts an automatic access to the webpage 120.

Alternatively, a second server 106 is used by the first server 105 as an authentication server 106, which authenticates requests to access the server resource 120 using path 150.

The CAPTCHA image 135, in accordance with the prior art, comprises two characters 'A' 136 and 'B' 137, which have been distorted. The distortion comprises a rotation of the B character 137, and a line 138. The user 118 responds to the CAPTCHA by typing the characters "A B" that are seen in an input box 140.

Figure 2:
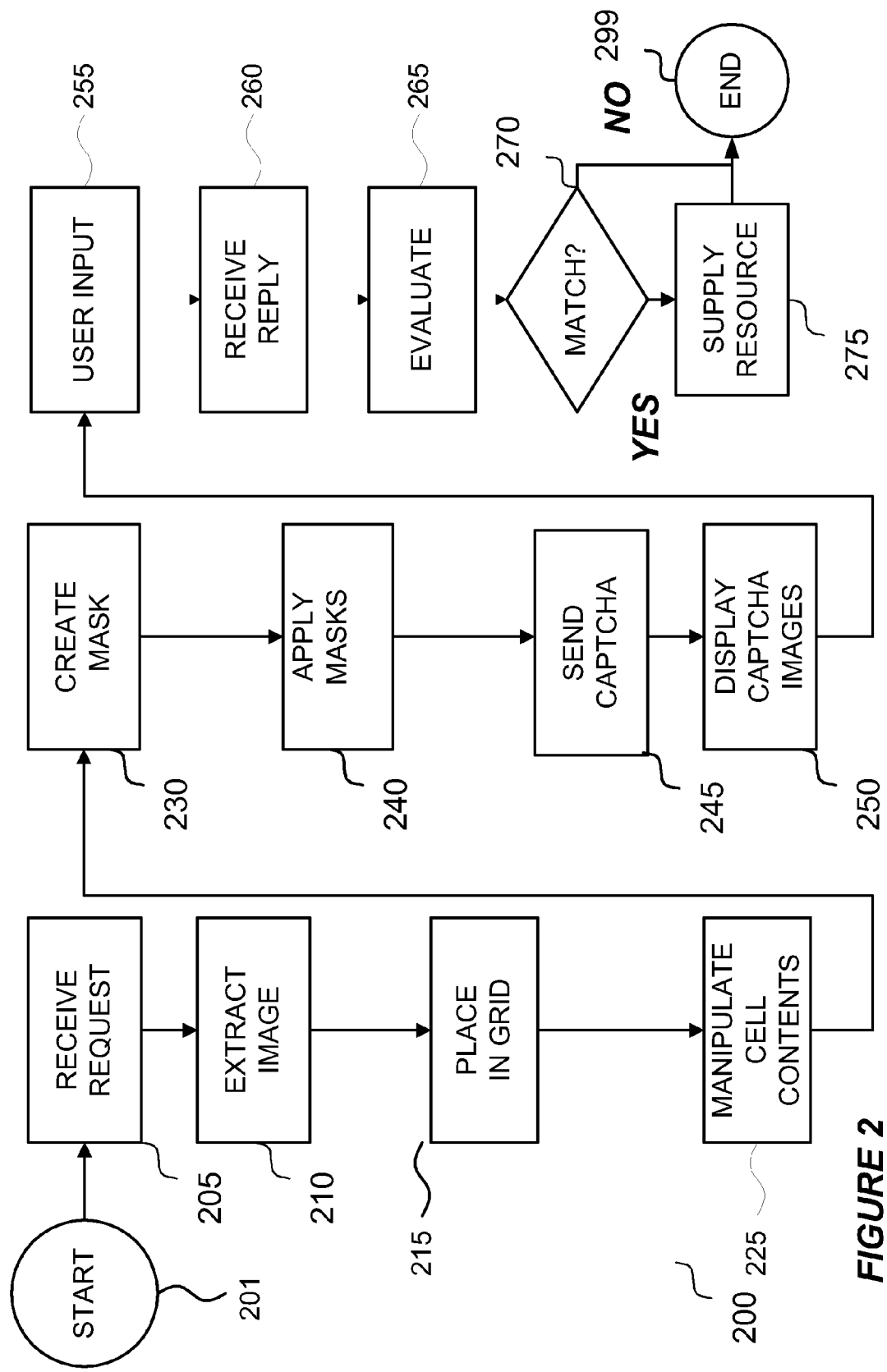
FIG. 2 is a high-level exemplary schematic flow diagram depicting operation method steps for providing a challenge response test associated with a computer resource, in accordance with a preferred embodiment of the present invention.
Figure 3:
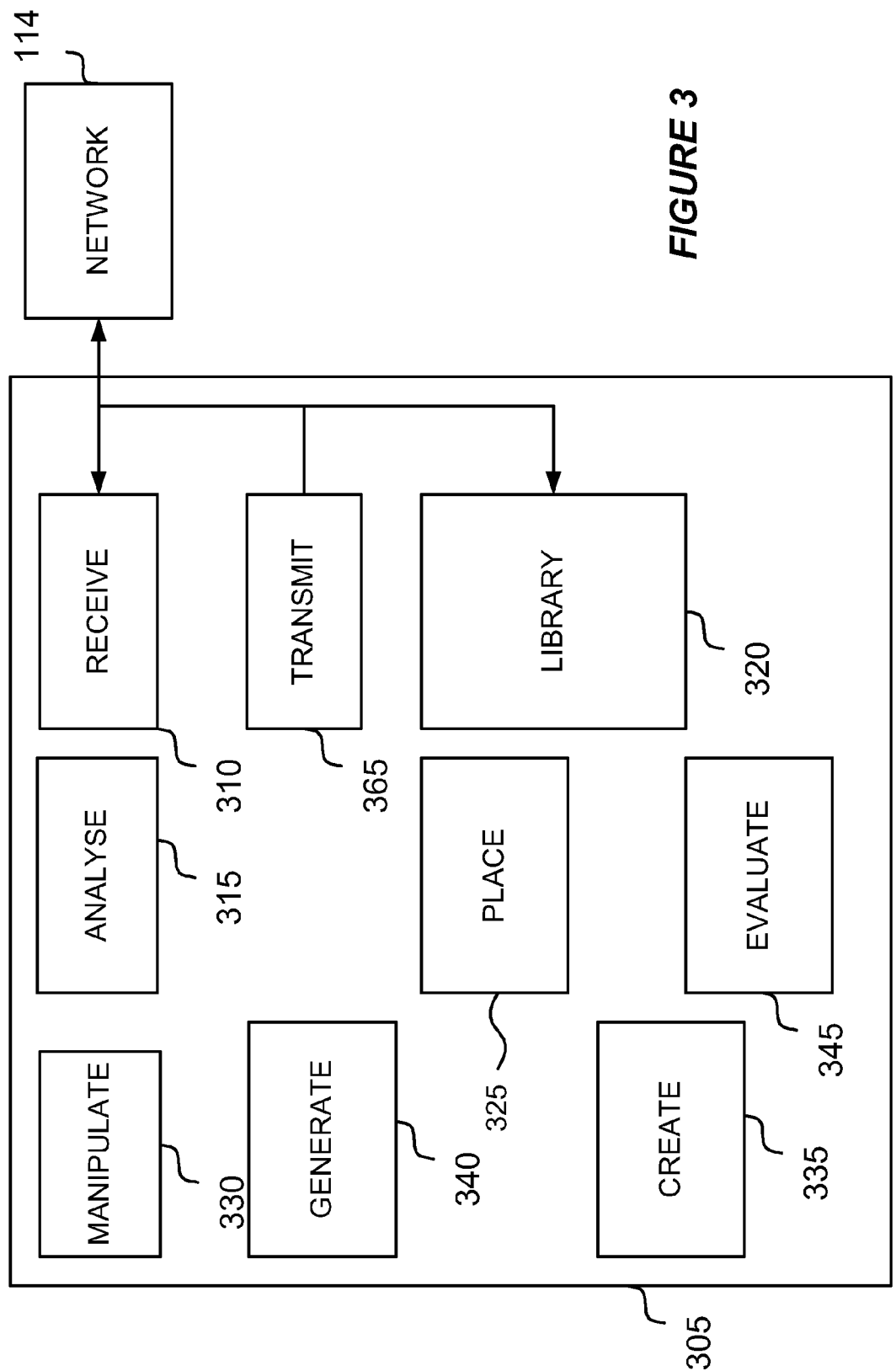
FIG. 3 is a block diagram depicting an apparatus operable on a server for providing a challenge response test associated with a computer resource, in accordance with a preferred embodiment of the present invention.
Figure 4:
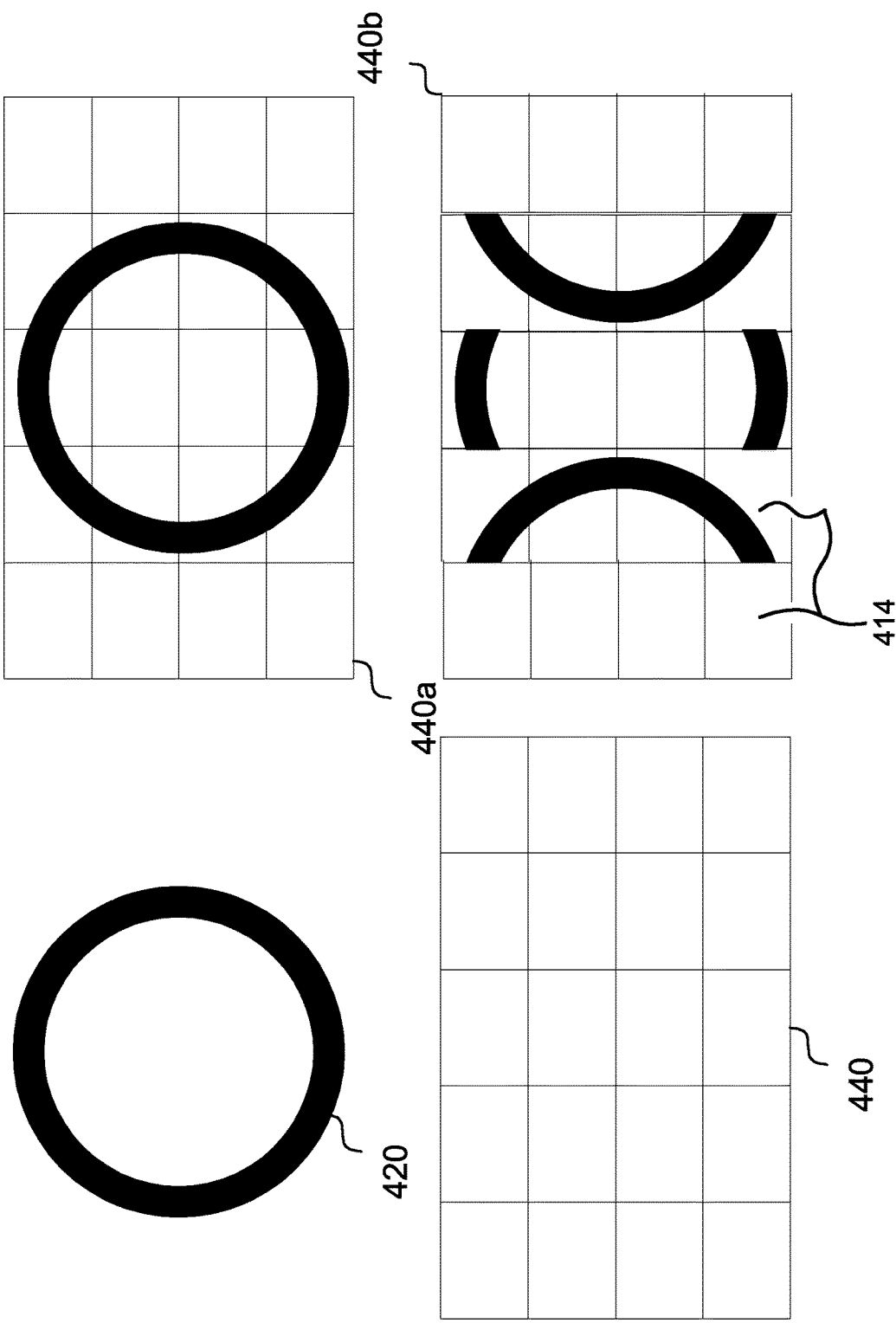
FIG. 4 is a block diagram depicting image elements used by the apparatus, in accordance with a preferred embodiment of the present invention.
Figure 5:
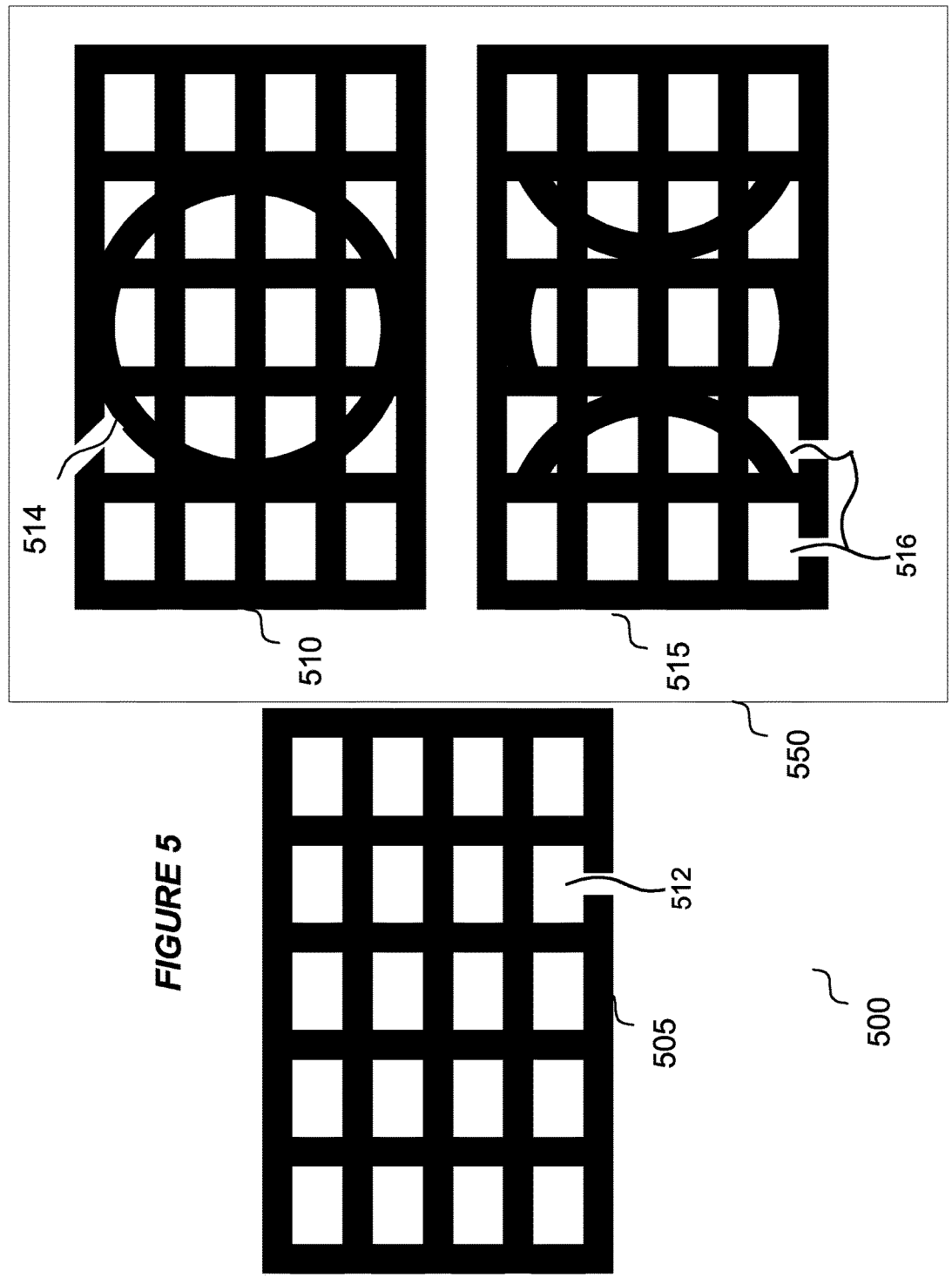
FIG. 5 is a block diagram depicting images generated by the apparatus, in accordance with a preferred embodiment of the present invention.

FIG. 2, which should be read in conjunction with FIGS. 3-5, is a high-level exemplary schematic flow diagram 200 depicting operation method steps for providing a challenge response test associated with a computer resource 120, in accordance with a preferred embodiment of the present invention. FIG. 3 is a block diagram depicting an apparatus 305 operable on a server 105, 106 for providing a challenge response test associated with a computer resource 120, in accordance with a preferred embodiment of the present invention. FIG. 4 is a block diagram depicting image elements 420, 440, 440a, 440b used by the apparatus 305, in accordance with a preferred embodiment of the present invention. FIG. 5 is a block diagram 500 depicting images 505, 510, 515 generated by the apparatus 305, in accordance with a preferred embodiment of the present invention.

FIG. 2 is set forth as a logical flow chart diagram. As such, the depicted order and labelled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

The method starts at step 201. At step 205, a user 118 enters a uniform resource locator (URL) address of a webpage 120, and sends a url request (not shown) to the first server 105. The first server 105 receives the url request and identifies that the url request is for a resource 120 that requires access to be authenticated. The first server 105 sends a CAPTCHA request associated with the resource 120 to the apparatus 305. A receive component 310 of the apparatus 305 receives the CAPTCHA request.

At step 210 an analyze component 315 analyzes the CAPTCHA request to determine an identifier for the resource 120. The analyze component 310 extracts a first source image 420 from a data source 320. Examples of a data source 320 are a library 320, or a data source 320 on the network 114. The first source image 420 is a well-formed image, in that the image is humanly recognisable. As an example, depicted in FIG. 4, a circle 420 is used for illustration purposes only, in the preferred embodiment.

At step 215, a place component 325 places the first source image 420 in a framework 440, which comprises a set of cells, to provide a filled framework 440a. An example of a framework 440 is an N×M grid 440, such as the 5×4 grid depicted in FIG. 4. The filled framework 440a is also a well-formed image 440a.

At step 225, a manipulate component 330 manipulates the contents of the filled framework 440a by moving cell contents in various configurations around to provide a manipulated framework 440b. The manipulated framework 440b is an ill-formed image comprising at least one first ill-formed portion 414. The first ill-formed portion 414 is inconsistent with the first source image 420.

At step 230, a create component 335 creates a mask 505. A mask 505 comprises a set of cells 512 comprising a portion 512 that allow a portion 514 of underlying information to be visible.

At step 240, a generate component 340 applies the mask 505 to the filled framework 440a to generate a substantially well-formed image 510. The substantially well-formed image represents the first source image 420 in that a human can recognise that the portions 514 of the image elements within the underlying cells are consistent with each other and with the first source image 420. The substantially well-formed image 510 is a first masked image 510 having a visible portion composed of portions 514 of the first source image 420.

The generate component 340 also applies the mask 505 to the manipulated framework 440b to generate an ill-formed image 515. The ill-formed image 515 comprises a second masked image 515 composed of at least one second ill-formed portion 516. The second ill-formed portion 516 of the second masked image 515 is inconsistent with the first source image 420.

The generate component 340 collates the substantially well-formed image 505, and the ill-formed image 515 to produce a challenge response test image (CAPTCHA image) 550.

At step 245, a transmit component 345 transmits the constructs of the produced CAPTCHA image 550 to the workstation 115. At step 250, the transmitted CAPTCHA image 550 is displayed in a window 130 of the workstation 115. The CAPTCHA challenges the user 118 to identify the substantially well-formed image 510, from the constructs of the CAPTCHA image 550.

The user 118 selects one of the constructs 510, 515 as the substantially well-formed image 510, and the workstation 115 sends a reply message to the apparatus 305.

At step 260, the receive component 310 receives the reply message. At step 265, an evaluate component 345 evaluates whether the reply message matches a value associated with the CAPTCHA image 550, the value indicating that the user 118 correctly selected the substantially well-formed image 510. If the user 118 is correct, at step 275, the apparatus 305 transmits an authentication message to the server 105. The server 105 supplies the resource 120 to the workstation 115 of the user 118.

The method ends at step 299.

Figure 6:
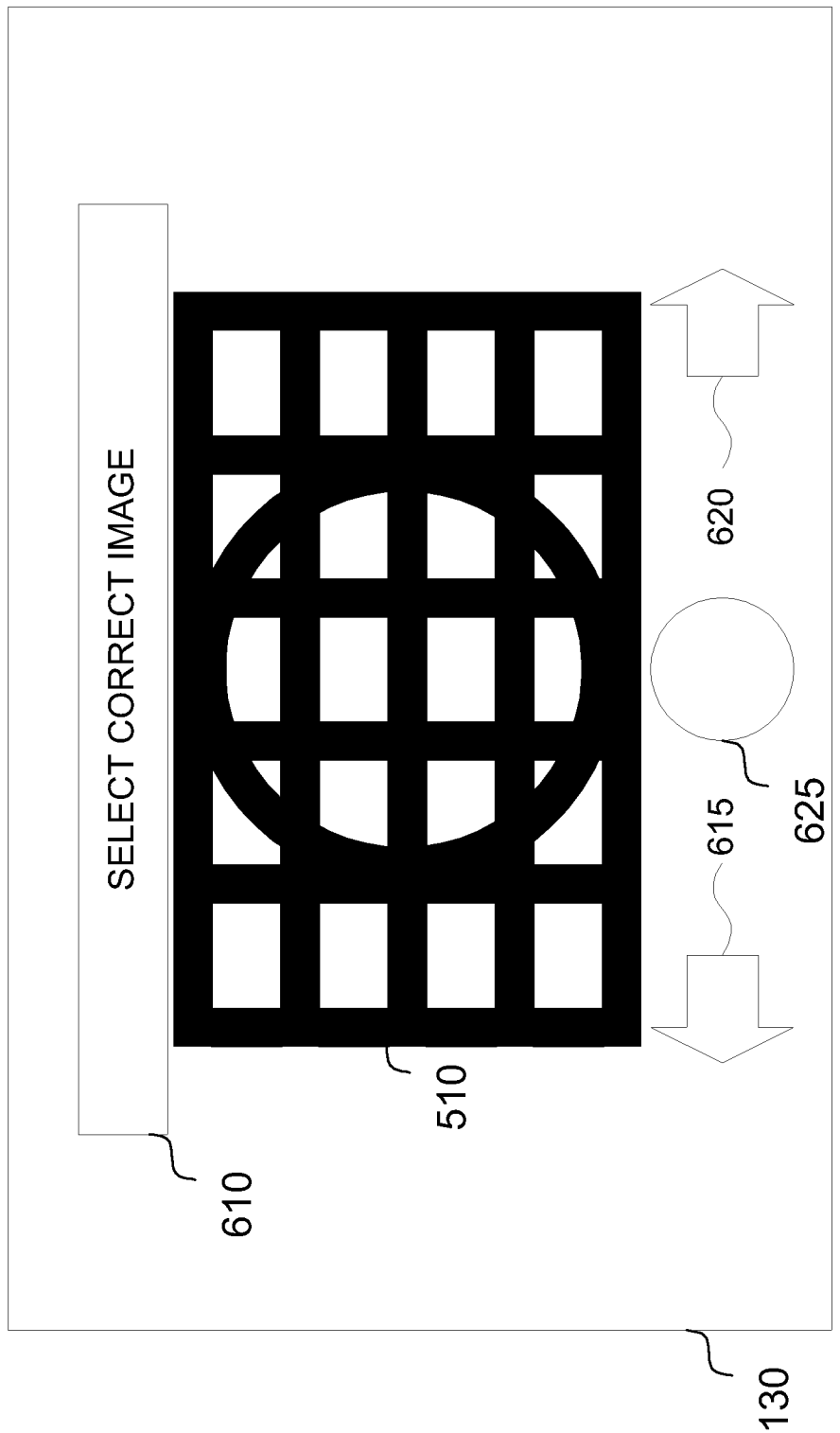
FIG. 6 depicts a presentation of the images the CAPT-CHA image to a user, in accordance with a preferred embodiment of the invention.

FIG. 6 depicts a presentation of the images 510, 515 of the CAPTCHA image 550 to the user 118, in accordance with a preferred embodiment of the invention. The user 118 is presented with instructions 610, left and right arrows 615 to review each of the images of the CAPTCHA image 550, and a select button 625 to select one of the images 510, 515. By pressing one of the arrows 615, one of the images 510, 515 is displayed. In an alternative embodiment, the images of the CAPTCHA image 550 are all shown together.

It will be evident to the skilled person that many different source images 420 could be used, and that a new first source image 420 should be used for each provision of a CAPTCHA. In a preferred embodiment, obscure sources are used for the first source image 420. This increases the difficulty for a cracking algorithm to perform a web search for all of the exposed images of the displayed constructs 605, 610, 615, choosing the one that returns the most hits as the correct one.

In an alternative embodiment, the manipulate component 330 manipulates the contents of the filled framework 440a multiple times to provide a set of manipulated frameworks 440b. The generate component 340 applies the mask 505 to the set of manipulated frameworks 440b to generate a set of ill-formed images 515. The generate component 340 collates the substantially well-formed image 505, and the ill-formed image 515 to produce a challenge response test image (CAPTCHA image) 550.

It is also evident to the skilled person that the number of cells can be varied, and the size of the portion 512 can be changed to display different amounts of the portion 514 of the underlying information to be made visible.

Figure 7:
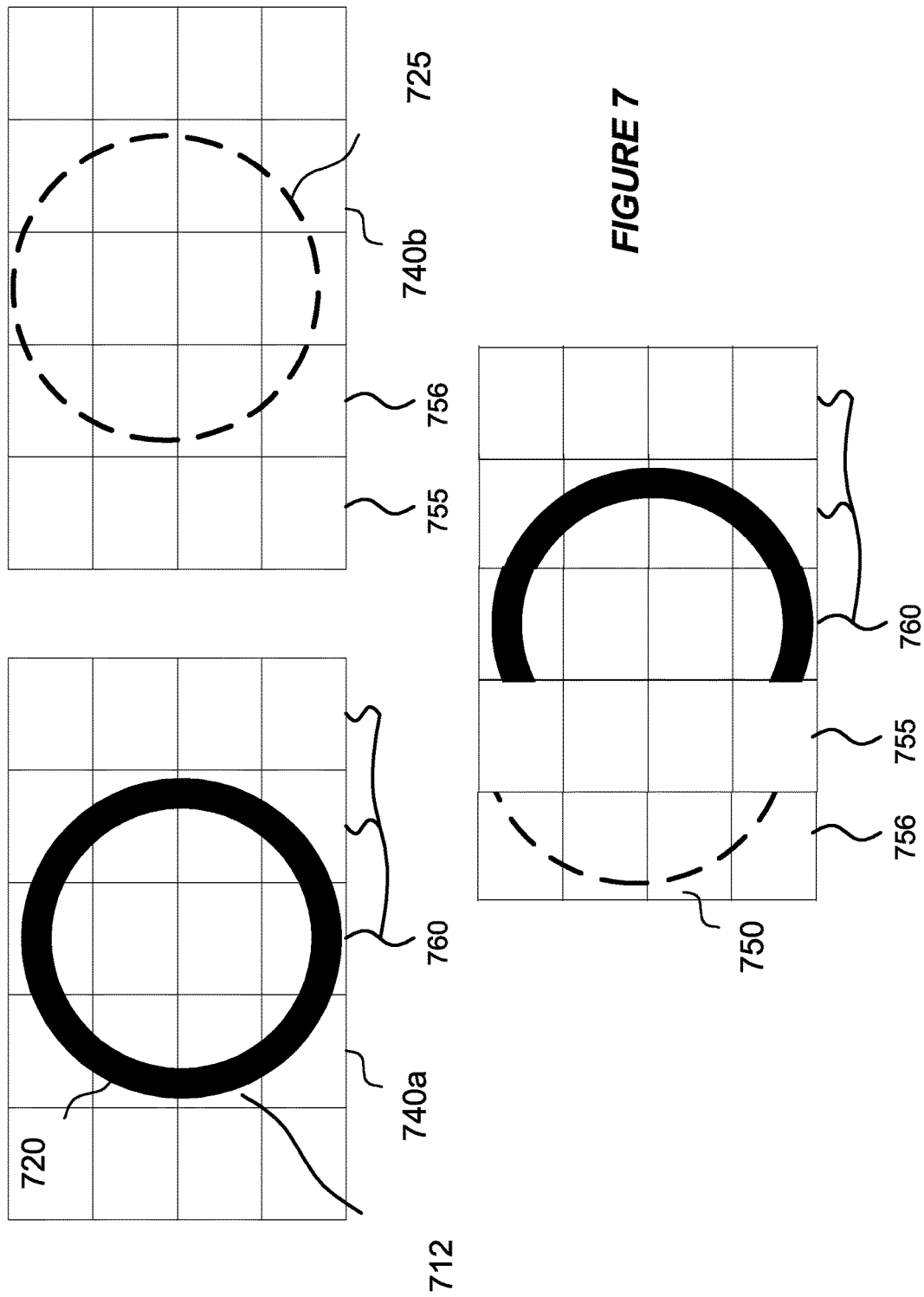
FIG. 7 depicts a second source image and a further image, in accordance with an alternative embodiment of the present invention.
Figure 8:
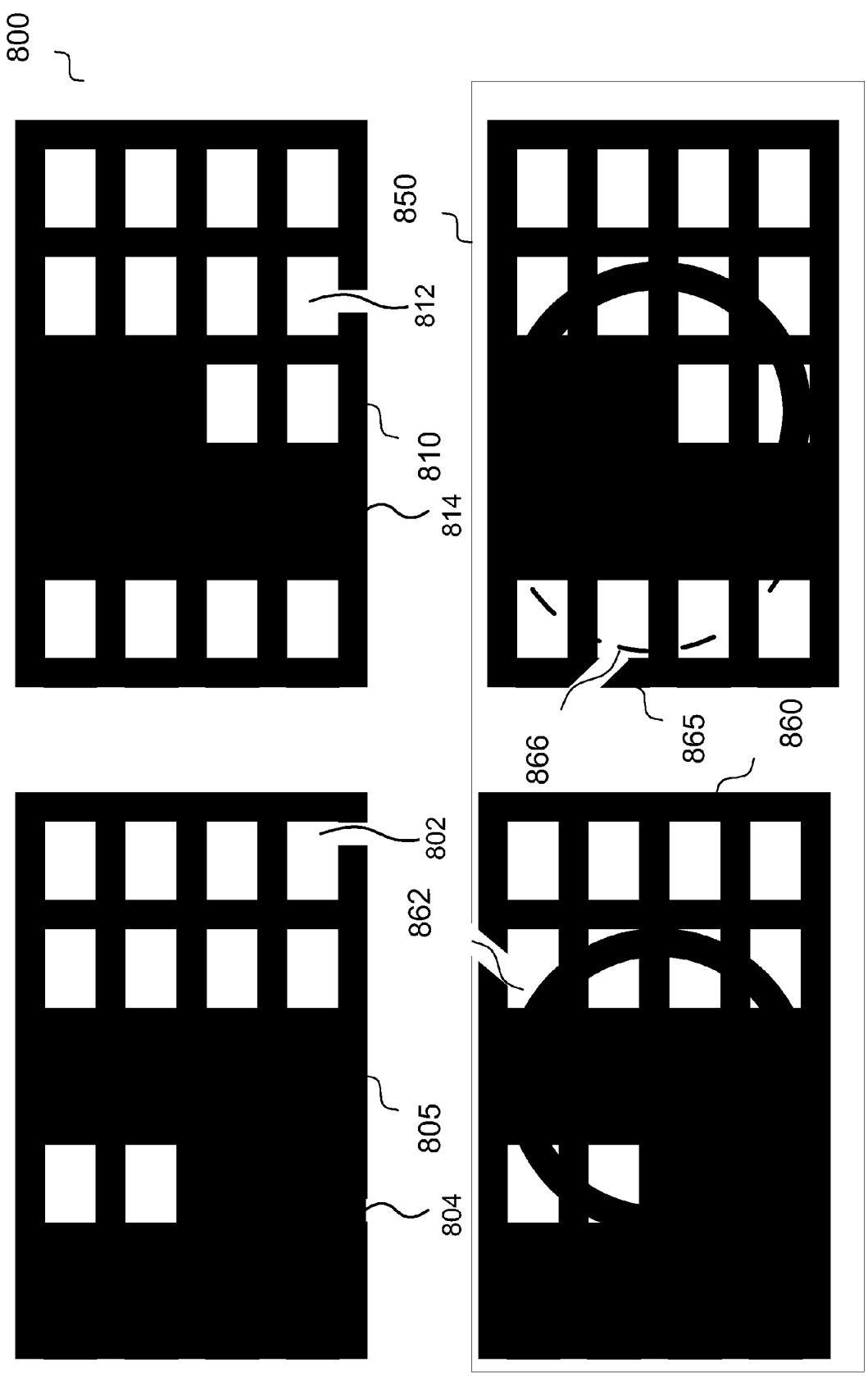
FIG. 8 is a block diagram depicting masks and images, used by the apparatus, in accordance with an alternative embodiment of the present invention.

FIG. 7, which should be read in conjunction with FIG. 2 and FIG. 8, depicts a second source image 720 and a further image 725, in accordance with an alternative embodiment of the present invention. FIG. 8 is a block diagram 800 depicting masks 805, 810 and images 860, 865 used by the apparatus 305, in accordance with an alternative embodiment of the present invention.

At step 210 the analyze component 315 analyzes the CAPTCHA request to determine an identifier for the resource 120.

At step 225, the manipulate component 330 manipulates the contents of the filled frameworks 740a, 740b by rearranging image elements 712 from the filled frameworks 740a, 740b to provide a manipulated framework 750. The manipulated framework 750 comprises image elements 760 from the first filled framework 740a, and image elements 755, 765 from the second filled framework 750b. Manipulation is carried out randomly. The apparatus 305 stores a record of which cell of the manipulated framework 750 came from which filled framework 740a, 740b. In an alternative embodiment, manipulation is based on attributes of the second source image 720 and the further image 725, for example, based on shading, shapes, or profiling.

At step 230, a create component 335 creates a good mask 805. A good mask 805 comprises a set of clear cells 802 that allow underlying information to be visible, and a set of cells 804 that do not allow underlying information to be visible. The good mask 805 is such that when applied to the manipulated framework 750, displays only cells of the manipulated framework 750 in which there are image elements 760 from the first filled framework 740a. The create component 335 also creates a bad mask 810. The bad mask 810 also comprises a set of clear cells 812 that allow underlying information to be visible, and a set of cells 814 that do not allow underlying information to be visible. A bad mask 810 is a mask that, when applied to the manipulated framework 750, displays cells in which there are image elements 755, 756 from the second filled framework 740b.

At step 240, a generate component 340 applies the good mask 805 to the manipulated framework 750 to generate a substantially well-formed image 860. The substantially well-formed image 860 represents the second source image 720 in that a human can recognise that the portions of the image elements within the underlying cells are consistent with each other and with the second source image 720. The substantially well-formed image 860 comprises a masked image 860 having a visible portion 862 entirely composed of portions from the second source image 720.

The generate component 340 also applies the bad mask 810 to generate a second ill-formed image 865. The second ill-formed image 865 comprises a masked image 865 comprising a third ill-formed portion 866. The third ill-formed portion 866 of the second ill-formed image 865 is inconsistent with the second source image 720.

The generate component 340 collates the substantially well-formed image 860, and each of the ill-formed image 865 to produce a challenge response test image (CAPTCHA image) 850.

In the alternative embodiment of FIG. 7, the other steps of the method of FIG. 2, are as described above.

In an alternative embodiment the analyze component 310 extracts a set of further images 725, and the place component 325 provides a set of second filled frameworks 740b. The create component 335 creates a set of bad masks 810. The generate component 340 applies the set of bad masks 810 to generate a set of second ill-formed images 865, and collates the substantially well-formed image 860, with each of the ill-formed images 865 to produce a challenge response test image (CAPTCHA image) 850.

In a preferred embodiment the second source image 720, and each of the set of further images 725 are similar in terms of size, brightness, contrast and other easily detectable artefacts.

In an alternative embodiment, to prevent cracking algorithms using the consistency of the mask colour, colours of the mask cells are varied, either randomly, or by selecting from the palette of the source image 720.

It will also be evident to the skilled person that different frameworks 440 could be used, for example a different size N×M grids 440, 1005, 1050, or a different size circular framework 830. In an alternative embodiment, the difficulty of the CAPTCHA can be increased, for example by modifying: the length of the source sentence; the size of the matrix; or, the number of ill-formed constructs presented to the user.

In an alternative embodiment, the apparatus 305 is operable on the authentication server 106.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that apparatus provide processes for implementing the functions/acts specified in the flowchart and/or block diagram block or blocks.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product or a computer program embodied in one or more computer readable medium(s) having computer readable program code embodied thereon.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

For the avoidance of doubt, the term "comprising", as used herein throughout the description and claims is not to be construed as meaning "consisting only of".

What is claimed is:

1. A method of providing a challenge response test, comprising:
   receiving a request for the challenge response test;
   placing a well-formed image within a framework including a plurality of cells;
   moving the plurality of cells within the framework to generate an ill-formed image;
   applying a mask to the well-formed image to generate a masked well-formed image;
   applying the mask to the ill-formed image to generate a masked ill-formed image; and
   providing, in response to the request, the masked well-formed image and the masked ill-formed image, wherein
   the masked well-formed image includes visible portions of the well-formed image, and
   the masked ill-formed image includes visible portions of the ill-formed image.

2. The method of claim 1, wherein
the mask is a grid including a plurality of cells.

3. The method of claim 2, wherein
each of the plurality of cells in the mask does not mask a portion of an image to which the mask is applied.

4. The method of claim 2, wherein
wherein at least one and less than all of the plurality of cells does not mask a portion of an image to which the mask is applied.

5. The method of claim 1, wherein
the ill-formed image includes a portion of the well-formed image and a portion of a second image.

6. The method of claim 1, wherein
a color of the mask is selected from a palette of the well-formed image.

7. A computer hardware system configured to provide a challenge response test, comprising:
   at least one hardware processor configured to initiate the following executable operations:
   receiving a request for the challenge response test;
   placing a well-formed image within a framework including a plurality of cells;
   moving the plurality of cells within the framework to generate an ill-formed image;
   applying a mask to the well-formed image to generate a masked well-formed image;
   applying the mask to the ill-formed image to generate a masked ill-formed image; and
   providing, in response to the request, the masked well-formed image and the masked ill-formed image, wherein
   the masked well-formed image includes visible portions of the well-formed image, and
   the masked ill-formed image includes visible portions of the ill-formed image.

8. The system of claim 7, wherein
the mask is a grid including a plurality of cells.

9. The system of claim 8, wherein
each of the plurality of cells in the mask does not mask a portion of an image to which the mask is applied.

10. The system of claim 8, wherein
wherein at least one and less than all of the plurality of cells does not mask a portion of an image to which the mask is applied.

11. The system of claim 7, wherein
the ill-formed image includes a portion of the well-formed image and a portion of a second image.

12. The system of claim 7, wherein
a color of the mask is selected from a palette of the well-formed image.

13. A computer program product, comprising a computer readable storage device having stored therein program code for providing a challenge response test, the program code, which when executed on a computer hardware system, causes the computer hardware system to perform: receiving a request for the challenge response test; placing a well-formed image within a framework including a plurality of cells; moving the plurality of cells within the framework to generate an ill-formed image; applying a mask to the well-formed image to generate a masked well-formed image; applying the mask to the ill-formed image to generate a masked ill-formed image; and providing, in response to the request, the masked well-formed image and the masked ill-formed image, wherein the masked well-formed image includes visible portions of the well-formed image, and the masked ill-formed image includes visible portions of the ill-formed image.

14. The computer program product of claim 13, wherein
the mask is a grid including a plurality of cells.

15. The computer program product of claim 14, wherein
each of the plurality of cells in the mask does not mask a portion of an image to which the mask is applied.

16. The computer program product of claim 14, wherein
wherein at least one and less than all of the plurality of cells does not mask a portion of an image to which the mask is applied.

17. The computer program product of claim 13, wherein
the ill-formed image includes a portion of the well-formed image and a portion of a second image.

18. The computer program product of claim 13, wherein
a color of the mask is selected from a palette of the well-formed image.

* * * * *